US012686973B2

(12) United States Patent
Hiltunen et al.

(10) Patent No.: US 12,686,973 B2
(45) Date of Patent: Jul. 21, 2026

(54) AQUEOUS ETHYL CELLULOSE DISPERSION

(71) Applicant: KEMIRA OYJ, Helsinki (FI)

(72) Inventors: Jaakko Hiltunen, Espoo (FI); Tarja Turkki, Espoo (FI)

(73) Assignee: Kemira Oyj (FI)

( * ) Notice: Subject to any disclaimer, the term of this patent is extended or adjusted under 35 U.S.C. 154(b) by 0 days.

(21) Appl. No.: 18/266,857

(22) PCT Filed: Dec. 16, 2021

(86) PCT No.: PCT/FI2021/050886
§ 371 (c)(1),
(2) Date: Jun. 13, 2023

(87) PCT Pub. No.: WO2022/129701
PCT Pub. Date: Jun. 23, 2022

(65) Prior Publication Data
US 2024/0084511 A1      Mar. 14, 2024

(30) Foreign Application Priority Data

Dec. 16, 2020    (FI) ..................................... 20206316

(51) Int. Cl.
D21H 19/52 (2006.01)
B65D 65/42 (2006.01)
(Continued)

(52) U.S. Cl.
CPC ............. D21H 19/52 (2013.01); B65D 65/42 (2013.01); C09D 7/63 (2018.01); C09D 101/28 (2013.01);
(Continued)

(58) Field of Classification Search
CPC ...... D21H 19/52; D21H 19/12; D21H 19/385; D21H 19/46; D21H 19/824; D21H 19/828;
(Continued)

(56) References Cited

U.S. PATENT DOCUMENTS

| | | | |
|---|---|---|---|
| 2,325,408 A | 7/1943 | Kauppi et al. | |
| 2,843,582 A | 7/1958 | Voris | |

(Continued)

FOREIGN PATENT DOCUMENTS

| | | |
|---|---|---|
| CN | 101602865 A | 12/2009 |
| CN | 103405776 A | 11/2013 |

(Continued)

OTHER PUBLICATIONS

International Search Report for PCT/FI2021/050886, mailed Mar. 14, 2022.
(Continued)

*Primary Examiner* — Betelhem Shewareged
(74) *Attorney, Agent, or Firm* — Elmore Patent Law Group, P.C.; Joseph C. Zucchero; Carolyn S. Elmore

(57) ABSTRACT

There is provided an aqueous dispersion comprising 40-90 wt-% ethyl cellulose and 10-50 wt-% at least one plasticizer, and to a film having water barrier property produced from the dispersion. Additionally, there is provided a fiber based substrate comprising at least one film layer produced from the aqueous dispersion.

9 Claims, 8 Drawing Sheets

(51) Int. Cl.

| | |
|---|---|
| *C09D 7/63* | (2018.01) |
| *C09D 101/28* | (2006.01) |
| *D21H 19/12* | (2006.01) |
| *D21H 19/38* | (2006.01) |
| *D21H 19/46* | (2006.01) |
| *D21H 19/82* | (2006.01) |
| *D21H 21/16* | (2006.01) |
| *D21H 27/10* | (2006.01) |
| *C08K 5/11* | (2006.01) |

(52) U.S. Cl.
CPC ........... *D21H 19/12* (2013.01); *D21H 19/385* (2013.01); *D21H 19/46* (2013.01); *D21H 19/824* (2013.01); *D21H 19/828* (2013.01); *D21H 21/16* (2013.01); *D21H 27/10* (2013.01); *C08K 5/11* (2013.01)

(58) Field of Classification Search
CPC ...... D21H 21/16; D21H 27/10; C09D 101/28; C09D 7/63; C08K 5/11; B65D 65/42
USPC ...................................................... 428/211.1
See application file for complete search history.

(56) References Cited

U.S. PATENT DOCUMENTS

| | | | | |
|---|---|---|---|---|
| 4,502,888 | A * | 3/1985 | Leng ........................... | C08J 3/03 |
| | | | | 524/569 |
| 6,451,350 | B1 | 9/2002 | Bartholomaeus et al. | |
| 2001/0021616 | A1 * | 9/2001 | Bullock ................. | D06N 3/183 |
| | | | | 442/76 |
| 2001/0027755 | A1 * | 10/2001 | Denesuk .............. | A01K 1/0353 |
| | | | | 119/709 |
| 2001/0035406 | A1 * | 11/2001 | Ryan ................... | B29C 66/8322 |
| | | | | 219/634 |
| 2004/0052844 | A1 | 3/2004 | Hsiao et al. | |
| 2006/0246263 | A1 * | 11/2006 | Yahiaoui .............. | B41M 5/5281 |
| | | | | 428/195.1 |
| 2007/0196581 | A1 | 8/2007 | Marcu et al. | |

| | | | | |
|---|---|---|---|---|
| 2008/0281042 | A1 * | 11/2008 | Soane .................. | C09D 101/00 |
| | | | | 428/479.6 |
| 2009/0321681 | A1 * | 12/2009 | Skuse ...................... | C08K 9/04 |
| | | | | 252/188.28 |
| 2024/0084511 | A1 * | 3/2024 | Hiltunen .............. | D21H 19/828 |

FOREIGN PATENT DOCUMENTS

| | | |
|---|---|---|
| CN | 104945675 A | 9/2015 |
| JP | S63192725 A | 8/1988 |
| WO | 2005118649 A1 | 12/2005 |
| WO | 2008036315 A2 | 3/2008 |
| WO | 2009112255 A1 | 9/2009 |
| WO | 2016105598 A1 | 6/2016 |
| WO | 2018038669 A1 | 3/2018 |

OTHER PUBLICATIONS

Search Report from FI20206316, mailed Mar. 19, 2021.
Kangarlou, S., et al., "Physico-Mechanical Analysis of Free Ethylcellulose Films Plasticized with Incremental Weight Percents of Dibutyl Sebacate", Iranian J. Pharma. Sci., 3(3), 135-142 (2007).
Kaur, R., et al., "Biodegradable Polymeric Film for Food Packaging", J. Applied Packaging Res., 11(2), 21-35 (2019).
Romero-Bastida, C. A, et al., "Effect of Plasticizer, pH and Hydration on the Mechanical and Barrier Properties of Zein and Ethylcellulose Films", Cienc. Tecnol. Aliment., 4(4), 2004, 251-256.
Tarvainen, M., et al., "Enhanced film-forming properties for ethyl cellulose and starch acetate using n-alkenyl succinic anhydrides as novel plasticizers", European J. Pharma. Sci., 19(5), 363-371 (2003).
Yang, Q. W, et al., "Curing of aqueous polymeric film coatings: Importance of the coating level and type of plasticizer", European J. Pharma. and Biopharma., 74(2), Feb. 2010, 362-370.
Zoubari, G. G., "Water-insoluble polymers as binders for controlled release matrix and reservoir pellets", Dissertation [retrieved online on Mar. 5, 2021]. Retrieved from https://refubium.fu-berlin.de/handle/fub188/5893, Feb. 2, 2015, 1-151.
Liu, et al., "effects of plasticizer and addititves on moisture permeability and mechanicalness of ethylcellulose aqueous dispersion free-film", Chinese J of New Drugs, 16(9), 2007, 708-712.

* cited by examiner

AQUEOUS ETHYL CELLULOSE DISPERSION

TECHNICAL FIELD

The present disclosure generally relates to an aqueous ethyl cellulose dispersion. The disclosure relates particularly, though not exclusively, to an aqueous dispersion comprising ethyl cellulose and plasticizer. The disclosure additionally relates to a fiber based substrate comprising a film layer produced from the dispersion.

BACKGROUND

This section illustrates useful background information without admission of any technique described herein representative of the state of the art.

Biobased and biodegradable packaging materials can be considered more sustainable than fossil based packaging materials. Need for recyclable, environmentally-friendly and non-fossil based materials is growing. Packaging material should provide mechanical, chemical and biological protection. Packaging materials should be safe, enable long self-life, reduce the loss of food and make the product more sustainable. In order for fiber based packaging to fulfill these requirements, barrier materials should give protection against oxygen, carbon dioxide, moisture, aromatic compounds, water, micro-organisms and grease. Most common challenges with biobarriers have been their low resistance to water, gases, heat and mechanical stress.

Ethyl cellulose is a derivative of cellulose in which some of the hydroxyl groups on the repeating glucose units are converted into ethyl ether groups. The number of ethyl groups can vary depending on the manufacturer.

Food grade ethyl cellulose is one of few non-toxic films and thickeners which are not water soluble. In order to give water (moisture) barrier properties formed film has to be pinhole free, continuous film. This property allows it to be used to safeguard ingredients from water. Ethyl cellulose is soluble in a wide range of solvents such as aliphatic alcohols, chlorinated solvents, and natural oils. Water soluble coating components should be avoided.

Packaging materials are often required to have adequate integrity to exclude moisture i.e having moisture (water) barrier. Examples of such packages are cardboard, boxboard, wrapping paper, food packages such as trays, bowls and cups.

Variety of compositions and techniques have been developed for coating (moisture barrier) films on packaging materials for improving moisture resistance of the packaging materials. Usually such compositions are solvent based composition.

As environmental awareness increases, consumers and manufacturers are seeking environmentally-friendly technologies and products. There is a demand for more environmentally packages with sufficient moisture barrier properties.

SUMMARY

The following presents a simplified summary of the features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

In a first aspect the present invention provides an aqueous dispersion comprising ethyl cellulose and at least one plasticizer. More particularly the present invention provides an aqueous dispersion comprising 40-90 wt-% ethyl cellulose and 10-50 wt-% at least one plasticizer, based on total dry weight of the dispersion.

In a second aspect the present invention provides a film (i.e. a coating) comprising ethyl cellulose and at least one plasticizer. More particularly the present invention provides a film comprising 40-90 wt-% ethyl cellulose and 10-50 wt-% at least one plasticizer based on total dry weight of the film.

In a third aspect the present invention provides an use of the aqueous dispersion of the present invention for coating at least one film layer one at least one surface of a substrate.

In a fourth aspect the present invention provides a fiber based substrate comprising at least one film layer on at least one surface of the fiber based substrate, wherein the film layer comprises 40-90 wt-% ethyl cellulose and 10-50 wt-% at least one plasticizer based on total dry weight of the film layer.

It has now been found that an aqueous dispersion comprising ethyl cellulose and at least one plasticizer can be produced.

It was surprisingly found that addition of plasticizer to an aqueous dispersion comprising ethyl cellulose improves film formation in self standing films even at room temperature.

If was also surprisingly found that when aqueous dispersion comprising ethyl cellulose and plasticizer was applied on folding boxboard using draw down coater and dried using IR dryer, a coating (film) layer with good water barrier properties is obtained. Additionally, even 10-20% pigment additions do not deteriorate water barrier properties. Said coating formulations give also grease barrier properties.

The water barrier film (layer) of the present invention can be coated directly on a surface of a substrate or on another film layer, such as a grease barrier layer, on the substrate.

The appended claims define the scope of protection.

DETAILED DESCRIPTION

Figure 1:
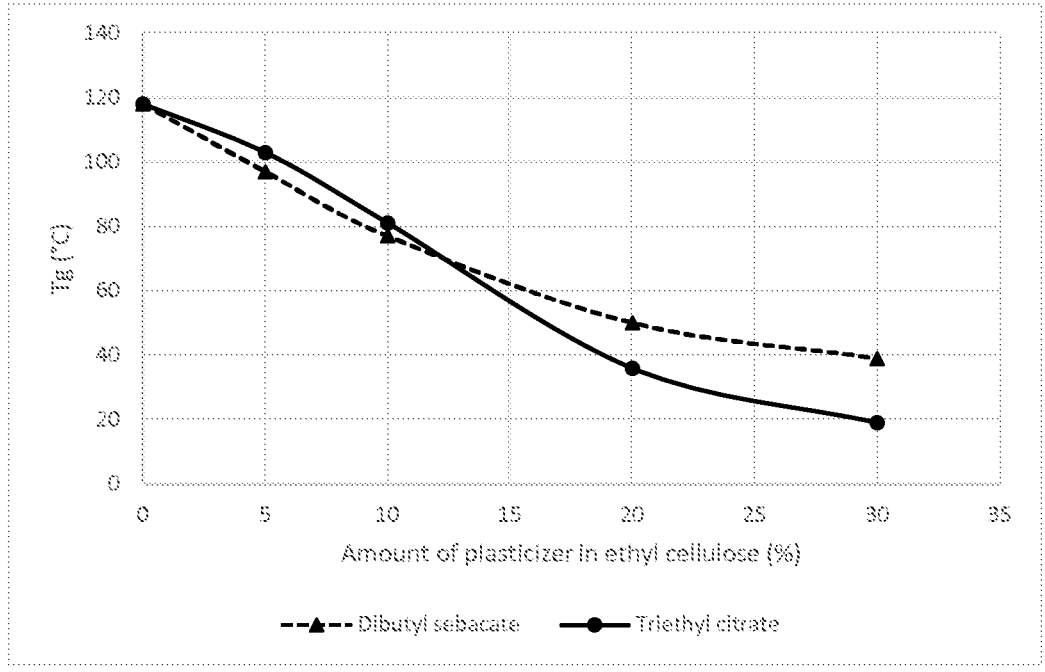
FIG. 1 shows glass transition temperatures of the ethyl cellulose and plasticizer blends.

In a first aspect the present invention provides an aqueous dispersion comprising 40-90 wt-% ethyl cellulose and 10-50 wt-% at least one plasticizer, based on total dry weight of the dispersion In one embodiment the dispersion comprises 45-85 wt-% ethyl cellulose, preferably 55-85 wt-%, more preferably 60-80 wt-%, based on total dry weight of the dispersion.

In one embodiment solids content of the coating formulation (dispersion) is high, in order to get high enough coat weight to form continuous film without pinholes. Preferably the total solids content is more than 30%.

Median values are defined as the value where half of the population resides above this point, and half resides below this point. For particle size distributions the median is called the D50 (or x50 when following certain ISO guidelines). The D50 is the size in microns that splits the distribution with half above and half below this diameter. The Dv50 (or Dv0.5) is the median for a volume distribution, Dn50 is used for number distributions, and Ds50 is used for surface distributions. Since the primary result from laser diffraction is a volume distribution, the default D50 cited is the volume median and D50 typically refers to the Dv50 without including the v. This value is one of the easier statistics to understand and also one of the most meaningful for particle size distributions.

In one embodiment D50 particle size of the ethyl cellulose is 10 nm-2 μm, preferably 50 nm-1 μm, more preferably 150 nm-250 nm. If the D50 particle size of the ethyl cellulose is larger, the ethyl cellulose is less reactive. If the D50 particle size of the ethyl cellulose is smaller, the reactive area of the ethyl cellulose increases rendering the process difficult to handle.

In one embodiment transition temperature (Tg) of the ethyl cellulose is at most 100° C. Glass Transition Temperature Test (ASTM E-1356) is the temperature of amorphous polymers at which increased molecular mobility results in significant changes in the thermal properties. Plastic products molded with oriented molecules expand differentially, as long as the glass transition temperature is not reached. The glass transition temperature is the temperature at which increased molecular mobility results in significant changes in the thermal properties of an amorphous resin. Above the glass transition temperature, the polymer tends to expand isotropically, and hysteresis is noted in the expansion or dimensional changes upon cooling, when the material will be rubbery and ductile.

In one embodiment the dispersion comprises 10-50 wt-% plasticizer, preferably 15-40 wt-%, more preferably 20-30 wt-%, based on total dry weight of the dispersion.

In one embodiment the plasticizer has solubility to water less than 100 g/l.

In one embodiment the plasticizer is bio-based plasticizer. Share of renewable carbon >50% of the molecular weight.

In one embodiment the plasticizer comprises e.g. triethyl citrate, dibutyl sebacate, butyl stearate, castor oil, butyl stearate, polyethylene glycol, triacetin and acetylated monoglycerides or mixtures thereof, preferably triethyl citrate, dibutyl sebacate or a mixture thereof.

In one embodiment the barrier formulation does not contain fluoro compounds and/or the plasticizer does not comprise phthalate(s).

In one embodiment the dispersion comprises 0.1-50 wt-% at least one pigment material, preferably 0.1-20 wt-%, more preferably 0.1-15 wt-%, based on total dry weight of the dispersion.

In one embodiment the pigment material comprises talc, kaolin or calcium carbonate (ground or precipitated).

In one embodiment the pigment material has antimicrobial effect. Examples of such pigment material are silver (Ag) and titanium dioxide (TiO$_2$).

In one embodiment the dispersion is substantially free of pigment material, preferably free of pigment material.

In one embodiment the dispersion comprises at most 20 wt-% at least one additional agent, preferably at most 10 wt-%, more preferably at most 9 wt-%, even more preferably at most 5 wt-%, based on total dry weight of the dispersion.

In one embodiment the additional agent comprises hydrophobic agent, wax, water retention and rheology modifier, defoamer, biocides, dispersants, surfactants, cross-linkers, lubricants, surface active agents or a mixture thereof. The additional agent is preferably selected from rheology modifiers, defoamers and biocides or a mixture thereof.

In one embodiment pigment material is excluded from the additional agent.

Hydrophobic agent comprises e.g. Rosin, Alkyl Ketene Dimer (AKD) or Alkenyl Succinic Anhydride (ASA) or their mixtures.

Waxes comprise paraffins, bees wax, carnauba wax, polyethylene wax or a mixture thereof.

Rheology modifiers comprise anionic polyacrylamide/ acrylate polymers, ionic hydrophobic polyether types and Polyvinyl alcohol, carboxymethyl cellulose, hydroxyethyl cellulose, starch, protein derivate and alkali swellable polyacrylate(s); non-ionic associative (HEUR/HMPE), anionic associative (HASE), non-associative thickener (ASE) technologies or a mixture thereof.

Defoamers comprise water based defoamers, oil based defoamers, powder defoamers, silicone based defoamers, polymer defoamers (EO/PO based defoamers), alkyl polyacrylates defoamers or a mixture thereof.

Biocides include oxidative biocides like hydrogen peroxide and sodium hypochlorite.

Surface active agents comprises anionic surfactants contain anionic functional groups at their head, such as sulfate, sulfonate, phosphate, and carboxylates. Prominent alkyl sulfates include ammonium lauryl sulfate, sodium lauryl sulfate (sodium dodecyl sulfate, SLS, or SDS), and the related alkyl-ether sulfates sodium laureth sulfate (sodium lauryl ether sulfate or SLES), or sodium myreth sulfate. Carboxylates are the most common surfactants and comprise the carboxylate salts (soaps), such as sodium stearate. Cationic surfactants can be either pH-dependent primary, secondary, or tertiary amines; primary and secondary amines become positively charged at pH<10:[29] octenidine dihydrochloride or permanently charged quaternary ammonium salts: cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB). Non-ionic surfactants are less sensitive to water hardness than anionic surfactants, and they foam less strongly. The differences between the individual types of non-ionic surfactants are slight, and the choice is primarily governed having regard to the costs of special properties (e.g., effectiveness and efficiency, toxicity, dermatological compatibility, biodegradability) or permission for use in food. Examples of nonionic surfactants include: Ethoxylates, e.g. Fatty alcohol ethoxylates, Triton X-100, and Fatty acid ethoxylates, Sorbitan monolaurate, Sorbitan monostearate, Sorbitan tristearate and Tweens. Fatty acid esters of sucrose include Alkyl polyglucosides e.g. Decyl glucoside, Lauryl glucoside and Octyl glucoside.

In one embodiment the aqueous ethyl cellulose dispersion is substantially free of agents promoting dissolution in water, preferably free of agents promoting dissolution in water.

In one embodiment transition temperature (Tg) of the dispersion is from −20° C. to 50° C., preferably from 0° C. to 40° C., more preferably from 0° C. to 30° C., even more preferably from 1° C. to 25° C., most preferably from 5° C. to 20° C. Glass Transition Temperature Test (ASTM E-1356) is the temperature of amorphous polymers at which increased molecular mobility results in significant changes in the thermal properties. Plastic products molded with oriented molecules expand differentially, as long as the glass transition temperature is not reached. The glass transition temperature is the temperature at which increased molecular mobility results in significant changes in the thermal properties of an amorphous resin. Above the glass transition temperature, the polymer tends to expand isotropically, and hysteresis is noted in the expansion or dimensional changes upon cooling, when the material will be rubbery and ductile.

If Tg of the dispersion is too low, a film produced from said dispersion is too soft and blocking may take place at rewinding. If Tg of the dispersion is too high, a film produced from said dispersion is too rigid and cracks when folded.

In one embodiment viscosity of the dispersion is defined as Brookfield 100 rpm: 50-3000 mPas or 100-2000 mPas.

In one embodiment the dispersion does not comprise phthalate(s) or fluoro compounds.

In one embodiment the dispersion is substantially free of organic solvents, preferably free of organic solvents.

One or more of the above disclosed embodiments can be combined.

In a second aspect the present invention provides a film comprising 40-90 wt-% ethyl cellulose and 10-50 wt-% at least one plasticizer based on total dry weight of the film.

In one embodiment the film comprises 45-85 wt-% ethyl cellulose, preferably 55-85 wt-%, more preferably 60-80 wt-%, based on total dry weight of the film.

In one embodiment D50 particle size of the ethyl cellulose is 10 nm-2 μm, preferably 50 nm-1 μm, more preferably 150 nm-250 nm. Median values are defined as the value where half of the population resides above this point, and half resides below this point. For particle size distributions the median is called the D50 (or x50 when following certain ISO guidelines). The D50 is the size in microns that splits the distribution with half above and half below this diameter. The Dv50 (or Dv0.5) is the median for a volume distribution, Dn50 is used for number distributions, and Ds50 is used for surface distributions. Since the primary result from laser diffraction is a volume distribution, the default D50 cited is the volume median and D50 typically refers to the Dv50 without including the v. This value is one of the easier statistics to understand and also one of the most meaningful for particle size distributions.

In one embodiment transition temperature (Tg) of the ethyl cellulose is at most 100° C. Glass Transition Temperature Test (ASTM E-1356) is the temperature of amorphous polymers at which increased molecular mobility results in significant changes in the thermal properties. Plastic products molded with oriented molecules expand differentially, as long as the glass transition temperature is not reached. The glass transition temperature is the temperature at which increased molecular mobility results in significant changes in the thermal properties of an amorphous resin. Above the glass transition temperature, the polymer tends to expand isotropically, and hysteresis is noted in the expansion or dimensional changes upon cooling, when the material will be rubbery and ductile.

In one embodiment the film comprises 10-50 wt-% plasticizer, preferably 15-40 wt-%, more preferably 20-30 wt-%, based on total dry weight of the film.

In one embodiment the plasticizer has solubility to water less than 100 g/l.

In one embodiment the plasticizer is bio-based plasticizer. Share of renewable carbon >50% of the molecular weight.

In one embodiment the plasticizer comprises e.g. triethyl citrate, dibutyl sebacate, butyl stearate, castor oil, butyl stearate, polyethylene glycol, triacetin and acetylated monoglycerides or mixtures thereof, preferably triethyl citrate, dibutyl sebacate or mixture thereof.

In one embodiment the barrier formulation does not contain fluoro compounds and/or the plasticizer does not comprise phthalate(s).

In one embodiment the film comprises 0.1-50 wt-% at least one pigment material, preferably 0.1-20 wt-%, more preferably 0.1-15 wt-%, based on total dry weight of the film.

In one embodiment pigment material comprises talc, kaolin, calcium carbonate (ground or precipitated) or a mixture thereof.

In one embodiment the pigment material has antimicrobial effect. Examples of such pigment material are silver (Ag) and titanium dioxide ($TiO_2$).

In one embodiment the film is substantially free of pigment material, preferably free of pigment material.

In one embodiment the film comprises at most 20 wt-% at least one additional agent, preferably at most 10 wt-%, more preferably at most 9 wt-%, even more preferably at most 5 wt-%, based on total dry weight of the film.

In one embodiment the additional agent comprises hydrophobic agent, wax, water retention and rheology modifier, defoamer, biocides, dispersants, surfactants, cross-linkers, lubricants, surface active agents or a mixture thereof. The additional agent is preferably selected from rheology modifiers, defoamers and biocides or a mixture thereof.

Hydrophobic agent comprises e.g. Rosin, Alkyl Ketene Dimer (AKD) or Alkenyl Succinic Anhydride (ASA) or their mixtures.

Waxes comprise paraffins, bees wax, carnauba wax, polyethylene wax or a mixture thereof.

Rheology modifiers comprise anionic polyacrylamide/acrylate polymers, ionic hydrophobic polyether types and Polyvinyl alcohol, carboxymethyl cellulose, hydroxyethyl cellulose, starch, protein derivate and alkali swellable polyacrylate(s); non-ionic associative (HEUR/HMPE), anionic associative (HASE) and non-associative thickener (ASE) technologies or a mixture thereof.

Defoamers comprise water based defoamers, oil based defoamers, powder defoamers, silicone based defoamers, polymer defoamers (EO/PO based defoamers), alkyl polyacrylates defoamers or a mixture thereof.

Biocides include oxidative biocides like hydrogen peroxide and sodium hypochlorite.

Surface active agents comprises anionic surfactants contain anionic functional groups at their head, such as sulfate, sulfonate, phosphate, and carboxylates. Prominent alkyl sulfates include ammonium lauryl sulfate, sodium lauryl sulfate (sodium dodecyl sulfate, SLS, or SDS), and the related alkyl-ether sulfates sodium laureth sulfate (sodium lauryl ether sulfate or SLES), and sodium myreth sulfate. Carboxylates are the most common surfactants and comprise the carboxylate salts (soaps), such as sodium stearate. Cationic surfactants can be either pH-dependent primary, secondary, or tertiary amines; primary and secondary amines become positively charged at pH<10:[29] octenidine dihydrochloride or permanently charged quaternary ammonium salts: cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB). Non-ionic surfactants are less sensitive to water hardness than anionic surfactants, and they foam less strongly. The differences between the individual types of non-ionic surfactants are slight, and the choice is primarily governed having regard to the costs of special properties (e.g., effectiveness and efficiency, toxicity, dermatological compatibility, biodegradability) or permission for use in food. Examples of nonionic surfactants include: Ethoxylates, e.g. Fatty alcohol ethoxylates, Triton X-100, and Fatty acid ethoxylates, Sorbitan monolaurate, Sorbitan monostearate, Sorbitan tristearate and Tweens. Fatty acid esters of sucrose include Alkyl polyglucosides e.g. Decyl glucoside, Lauryl glucoside and Octyl glucoside.

In one embodiment pigment material is excluded from the additional agent.

In one embodiment the film is substantially free of agents promoting dissolution in water, preferably free of agents promoting dissolution in water.

In one embodiment the film has thickness of 100 nm-100 μm

In one embodiment the film has weight of 0.5-30 g/m² preferably 1-25 g/m², 1-20, more preferably 1.5-20 g/m².

In one embodiment the film has water absorption value Cobb 60 seconds g/m2, ISO 535 standard.

One or more of the above disclosed embodiments can be combined.

In a third aspect the present invention provides an use of the aqueous dispersion of the present invention for coating at least one film layer of the present invention on at least one surface of a substrate.

In one embodiment at least two or more film layers are coated on at least one surface of a substrate.

In one embodiment one film layer has weight of 0.5-30 g/m² preferably 1-25 g/m², 1-20, more preferably 1.5-20 g/m²

The more film layers are coated on a substrate surface the better is its water (moisture) barrier properties.

In one embodiment the substrate comprises fiber based packaging materials such as cardboard, boxboard, folding boxboard, fluting, liner, liquid packaging board or wrapping paper.

A surface of a substrate can be coated with any suitable method known in the art. An example of such method is metered size press, rod coating, blade coating, air knife, spray coating, or curtain coating. In rod and blade coating excess of coating color is applied on paper surface and then rod or blade is used to meter the desired amount of coating on the surface. In MSP, curtain and spray coating, coating color is applied to paper/board surface directly using roll applicator, spray or curtain and no additional metering is needed. Machine speed in barrier coating operation is typically several hundred meters per minute or even thousand meters per minute. Runnability window is different for different coating method/customer specific determined by machine speed, coating solids, high shear rate viscosity, dynamic surface tension, etc.

The film of the present invention may be coated directly on the substrate surface or on an additional film layer on the substrate and/or between two additional film layers on the substrate. The additional film layer is different from the film of the present invention, i.e. the additional film layer can be any suitable film layer excluding the film of the present invention.

In one embodiment the additional film layer is a barrier layer excluding the film of the present invention. In one embodiment the barrier layer comprises a grease barrier layer such as water soluble cellulose derivative layer, an oxygen barrier layer, a mineral oil barrier layer or an aroma barrier layer, preferably a grease barrier layer.

The film of the present invention and/or the additional film layer may be coated to cover the whole surface of the substrate or at least a part of the surface of the substrate or as a pre-determined pattern.

In a fourth aspect the present invention provides a substrate comprising at least one film layer of the present invention on at least one surface of the substrate.

More particularly, the present invention provides a fiber based substrate comprising at least one film layer on at least one surface of the fiber based substrate, wherein the film layer comprises 40-90 wt-% ethyl cellulose and 10-50 wt-% at least one plasticizer based on total dry weight of the film layer.

In one embodiment the fiber based substrate comprises fiber based packaging materials such as food packaging materials, cardboard, boxboard, folding boxboard, fluting, liner, liquid packaging board or wrapping paper. Preferably the fiber based substrate is food packaging material.

In one embodiment the film layer comprises 0.1-50 wt-% at least one pigment material, preferably 0.1-20 wt-%, more preferably 0.1-15 wt-%, based on total dry weight of the film layer.

In one embodiment the film layer comprises at least one additional agent at most 20 wt-% preferably at most 10 wt-%, more preferably at most 9 wt-%, even more preferably 5 wt-%, based on total dry weight of the film layer.

In one embodiment the additional agent comprises hydrophobic agent, wax, water retention and rheology modifier, defoamer, biocides, dispersants, surfactants, cross-linkers, lubricants, surface active agents or a mixture thereof. The additional agent is preferably selected from rheology modifiers, defoamers and biocides or a mixture thereof.

In one embodiment pigment material is excluded from the additional agent.

In one embodiment the film layer comprises 45-85 wt-% ethyl cellulose, preferably 55-85 wt-%, more preferably 60-80 wt-%, based on total dry weight of the film layer.

In one embodiment the film layer comprises 15-40 wt-%, plasticizer, preferably 15-30 wt-%, more preferably 20-30 wt-%, based on total dry weight of the film layer.

In one embodiment D50 particle size of the ethyl cellulose is 10 nm-2 μm, preferably 50 nm-1 μm, more preferably 150 nm-250 nm.

In one embodiment the plasticizer has solubility to water less than 100 g/l.

In one embodiment the plasticizer comprises triethyl citrate, dibutyl sebacate, butyl stearate, castor oil or mixtures thereof, preferably triethyl citrate, dibutyl sebacate or a mixture thereof.

In one embodiment a single layer of the film layer has weight of 0.5-30 g/m² preferably 1-25 g/m², 1-20, more preferably 1.5-20 g/m².

In one embodiment the film layer cover at least one surface of the fiber based substrate in whole, at least a part of the surface or a pre-determined pattern of the surface.

In one embodiment the fiber based substrate comprises at least one additional film layer on at least one surface of the substrate. The additional film layer is different from the film layer of the present invention, i.e. the additional film layer can be any suitable film layer excluding the film layer of the present invention.

In one embodiment the additional film layer is a barrier layer excluding the film layer of the present invention. In one embodiment the barrier layer comprises a grease barrier layer such as water soluble cellulose derivative layer, an oxygen barrier layer, a mineral oil barrier layer or an aroma barrier layer, preferably a grease barrier layer.

In one embodiment the film layer is directly on the surface of the substrate.

In one embodiment the additional film layer is on surface of the substrate and the film layer is on the additional film layer.

In one embodiment the film layer is between the additional film layers, preferably between two additional film layers.

In one embodiment the additional film layer is between the film layers, preferably between two film layers.

In one embodiment the film layer and the at least one additional film layer are coated to cover the whole surface of the substrate or at least a part of the surface of the substrate or as a pre-determined pattern.

One or more of the above disclosed embodiments can be combined.

EXAMPLES

Materials and Methods

Ethyl cellulose powder from Sigma Aldrich, Tg 118° C., D50 117 nm.

Triethyl citrate from Sigma Aldrich

Aquacoat ECD ethyl cellulose dispersion from DuPont, Tg 72° C., weakly crystalline.

Calcium carbonate pigment Hydrocarb 60 from Omya.

Finnfix 10 carboxymethyl cellulose from CP Kelco, dissolved at 10% solids content.

Etingal L defoamer, Fatty acid polyether, from BASF.

Folding boxboard as substrate, grammage 265 g/m².

Coating formulations were prepared by mixing under magnetic stirrer for 30 minutes. For dispersions made using ethyl cellulose powder IKA disperser Ultra-Turrax was used to homogenize the dispersion.

A Brookfield DV-E (Brookfield GmbH, Lorch, Germany) viscometer was used for measurement of the coating colors' bulk viscosity immediately after preparation.

Different spindles were used in accordance with the respective samples' viscosity range. The measurements were performed at 100 rpm.

Laboratory coating tests were carried out by using draw down K control coater (RK Print Coat Instruments, Litlington, UK) with different wound rods and coating speeds. Samples were dried using InfraRR IR dryers for 60 seconds. Single and double coated samples were prepared. The used substrate in coating tests was virgin fiber based carton board with basis weight of 265 g/m2. Barrier coating was applied on the uncoated bottom side.

Coat weight was determined by weighting the coated samples and uncoated base papers and coat weight was obtained by the weight difference. Simple converting test was done for the samples including sample creasing using Cyklos CPM 450 creasing and perforation unit. Creasing and folding was done in machine and cross directions. Staining test was done for the creased samples by using methyl red dissolved in ethanol. For folding Cobb roller was used to give uniform folding pressure.

Surface energy measurements were carried out by measuring contact angle data using Fibro Dynamic Contact Angle Tester instrument using water and diiodomethane as liquid phase. Water resistance was tested using Cobb60 test, ISO 535 Paper and board—Determination of water absorptiveness—Cobb method. Water vapor barrier properties were measured using Systech Permeation Analyzers M7002 instrument. Grease barrier properties were tested using olive oil following ASTM F119-82 test method. Oil was dropped on cotton fabric placed on the barrier coated side of the folded sample and 50 gram weight was placed on top of the sample. Blocking tests were carried out at 40° C. temperature and 150 bar pressure for four hours. The barrier coated sample was placed against the top side coating. Used scale for blocking test results is shown in table 1.

TABLE 1

| Result | Explanation |
|---|---|
| 1 | Sample do not adhere |
| 2 | No coating damage when pulling apart the samples but some noise is heard |
| 3 | Coating defects <50% of the area when pulling apart the samples |
| 4 | Coating defects >50% of the area when pulling apart the samples |
| 5 | Base paper delamination when pulling apart the samples |

Analysis Methods

Glass transition temperature was determined using Differential Scanning calorimeter, DSC, Mettler Toledo DSC 3+.

Particle size distribution was measured using Malvern Zetasizer Nano ZS.

Samples

Reference sample: ethyl cellulose powder.

Sample according to the present invention: ethyl cellulose powder (Sigma Aldrich)+plasticizer.

Ethyl cellulose was softened by using plasticizers. Blends (samples) with two plasticizers were made in water shown in table 2. Total solids content was 20%. Glass transition temperatures for the blends are shown in FIG. 1.

TABLE 2

|  | 1 | 2 | 3 | 4 | 5 | 6 |
|---|---|---|---|---|---|---|
| Ethyl cellulose | 95 | 90 | 80 | 95 | 90 | 80 |
| Dibutyl sebacate | 5 | 10 | 20 | | | |
| Triethyl citrate | | | | 5 | 10 | 20 |

Coating test was carried out using 20% triethyl citrate as plasticizer. Coating was done after homogenized with mixer. Staining test was done for the coated samples. Film was not formed and stain penetrated through the sample.

Coating tests with ethyl cellulose dispersion Aquacoat ECD:

Example 1, According to Present Invention

Ethyl cellulose dispersion and 20% triethyl citrate were mixed and cast to free standing films and applied as coating on folding boxboard.

|  | Parts (%) |
|---|---|
| Aquacoat ECD-30 | 70 |
| Triethyl citrate | 30 |

Figure 2A:
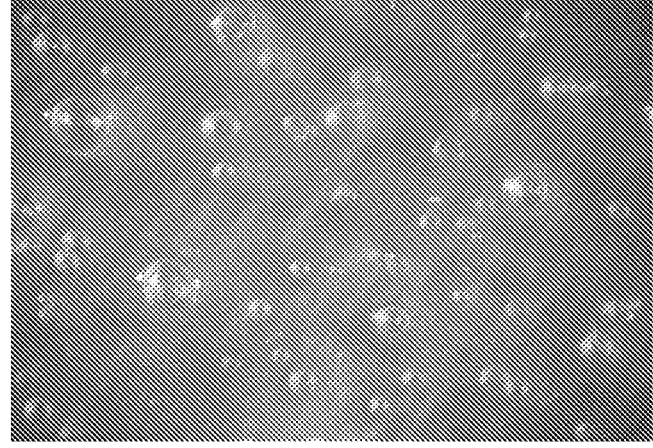
FIGS. 2a and 2b show films according to present invention dried at 60° C. or at room temperature respectively.
Figure 2B:
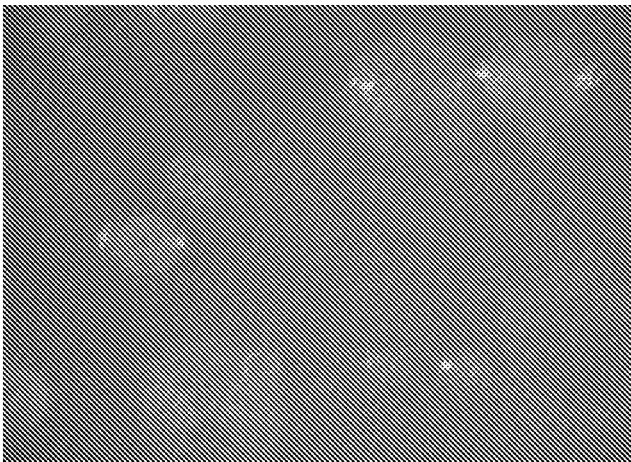

Clear self-standing films shown in FIGS. 2a and 2b with some air bubbles were obtained when dried at 60° C. or at room temperature respectively.

Figure 3A:
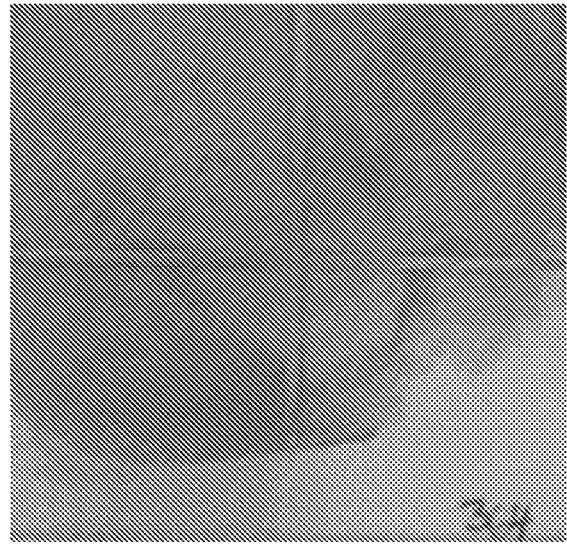
FIGS. 3a and 3b show coatings according to present invention applied using draw down coater.
Figure 3B:

Coating, shown in FIGS. 3a and 3b, on FBB was applied using draw down coater and rod 3. Rheology modifier was used and HEC Mw 380000 was added to coating color. Sample 363 is single coated and 364 double coated. It can be seen that coating layer has formed a continuous film but there are some pinholes on both samples most likely due to air bubbles.

Relatively good water barrier properties, as shown in table 3, were obtained even if the coated samples had pinholes. KIT test is not suitable for ethyl cellulose coatings as it is soluble in organic solvents. Without pigment addition there is a risk for blocking at high coat weights.

TABLE 3

| id | Coat weight (g/m²) | Cobb60 (g/m²) | Blocking | WVTR (g/m²/d) |
|---|---|---|---|---|
| 363 | 10.9 |  | 5 | 93 |
| 364 | 18.3 | 2 |  | 54 |

Figure 4:
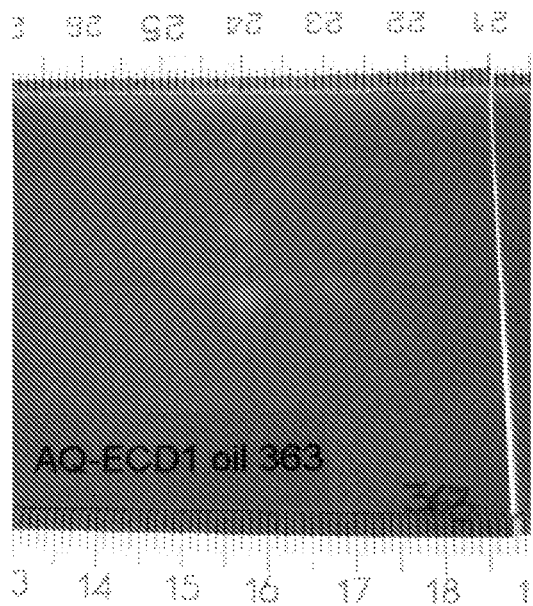
FIG. 4 show grease barrier test by using olive oil on creased sample according to the present invention.

Grease barrier test was carried out by using olive oil on creased samples. Minor cracking at crease was seen on single coated sample shown in FIG. 4.

Ethyl cellulose gives water and grease barrier properties when used together with plasticizers.

Example 2. Addition of Pigments, According to Present Invention

In table 4 are shown blends according to the present invention.

TABLE 4

|  | ECD-2 | ECD-3 | ECD-4 |
|---|---|---|---|
| Aquacoat ECD | 70 | 60 | 50 |
| Triethyl citrate | 20 | 20 | 20 |
| Hydrocarb 60 | 10 | 20 | 30 |
| Finnfix 10 | Adjust Br100 viscosity to around 1000 mPas | | |
| Etingal L | Add defoamer if coating color is foaming | | |

In all coating colors CMC was added to adjust the Brookfield 100 viscosity to about 1000 mPas and few drops of defoamer was added.

Results: As ethyl cellulose is soluble in organic solvents it does not give mineral oil barrier. KIT test cannot be used to test grease barrier properties but normal olive oil test is applicable.

Blocking results are good as shown in table 5, only at very high coat weights there was blocking issues. Best water barrier results were obtained with 10-20% pigment content.

TABLE 5

| Sample id | Coat weight (g/m²) | Pigment content (%) | Blocking | Cobb60 (g/m²) | Cobb300 (g/m²) | WVTR (g/m²/d) |
|---|---|---|---|---|---|---|
| 373 | 20.7 | HC60 10 |  | 4 | 8 |  |
| 374 | 11.1 | HC60 10 |  |  |  | 107 |
| 376 | 20.9 | HC60 10 | 2 |  |  |  |
| 381 | 15.7 | HC60 20 |  | 2 |  | 90 |
| 382 | 9.8 | HC60 20 |  |  |  |  |
| 383 | 10.1 | HC60 20 | 1 |  | 18 |  |
| 377 | 25.6 | HC60 30 | 4.5 |  |  | 102 |
| 378 | 11.6 | HC60 30 |  | 4 |  |  |
| 379 | 8.0 | HC60 30 | 1 |  | 31 |  |

Figure 5A:
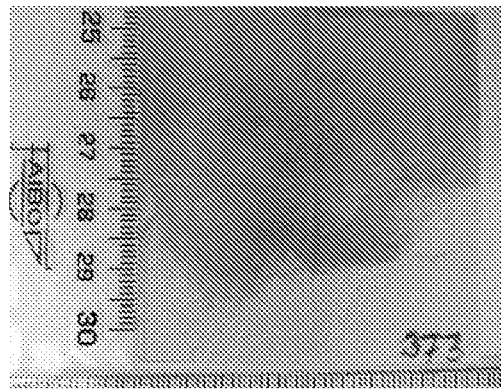
FIGS. 5a, 5b and 5c show staining test images for samples 373, 374 and 376 with 10% calcium carbonate in barrier coating according to the present invention.
Figure 5B:
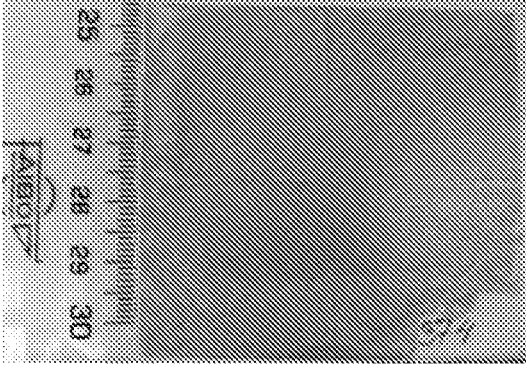
Figure 5C:
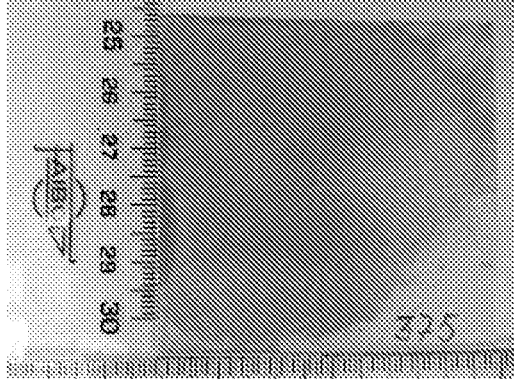

Staining test images for samples 373, 374 and 376 with 10% calcium carbonate in barrier coating are shown in FIGS. 5a, 5b and 5c.

Figure 6A:
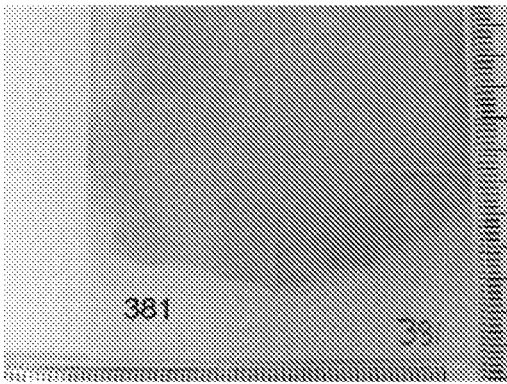
FIGS. 6a, 6b and 6c show staining test images for samples 381, 382 and 383 with 20% calcium carbonate in barrier coating according to the present invention.
Figure 6B:
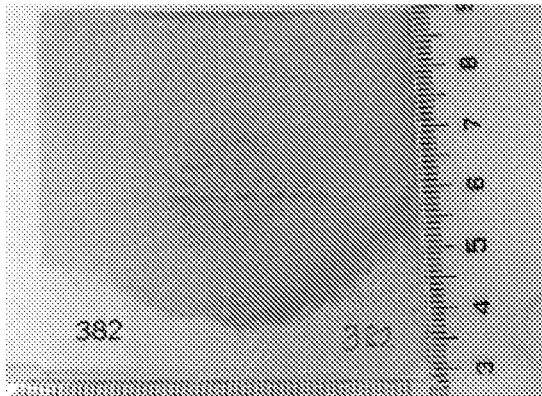
Figure 6C:
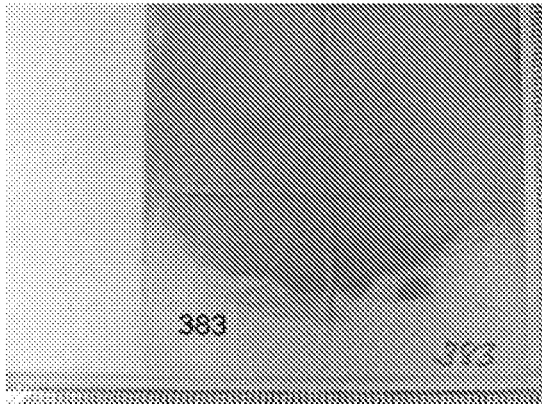

Staining test images for samples 381, 382 and 383 with 20% calcium carbonate in barrier coating are shown in FIGS. 6a, 6b and 6c.

Figure 7A:
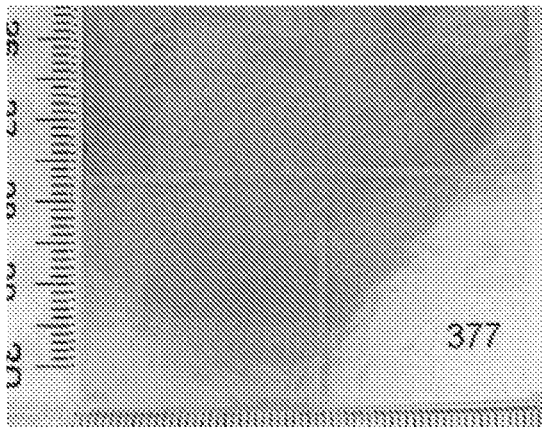
FIGS. 7a, 7b and 7c show staining test images for samples 377, 378 and 379 with 30% calcium carbonate in barrier coating according to the present invention.
Figure 7B:
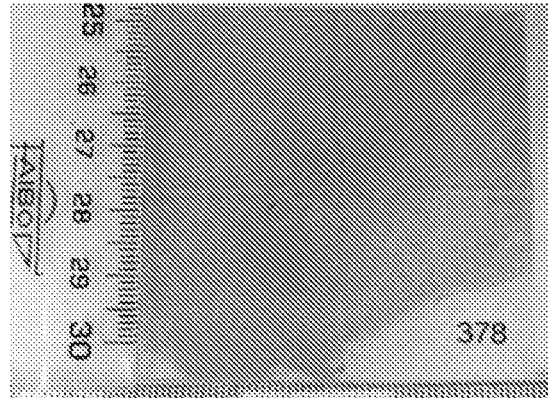
Figure 7C:
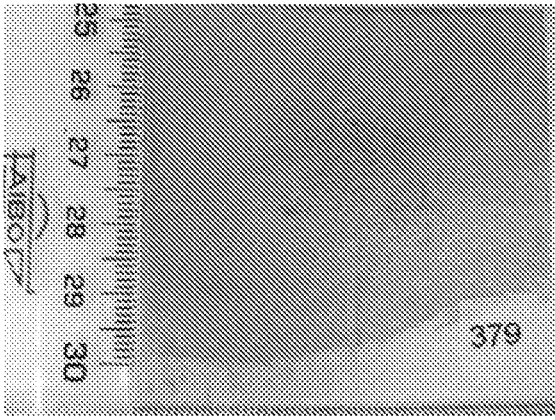

Staining test images for samples 377, 378 and 379 with 30% calcium carbonate in barrier coating are shown in FIGS. 7a, 7b and 7c.

As shown in FIGS. 5, 6 and 7 higher pigment content deteriorates film forming properties in barrier coatings with ethyl cellulose.

Figure 8A:
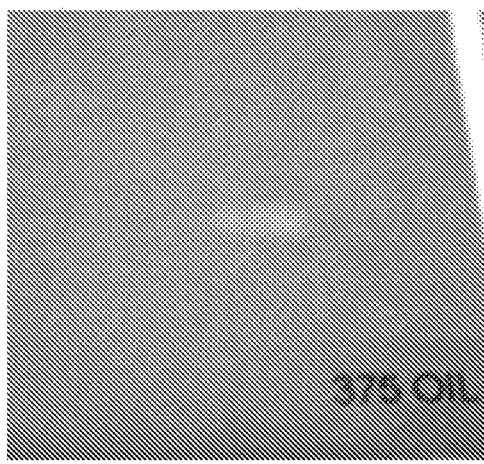
FIGS. 8a, 8b and 8c show olive oil test results for samples containing 10, 20 and 30% of calcium carbonate according to the present invention, respectively.
Figure 8B:
Figure 8C:
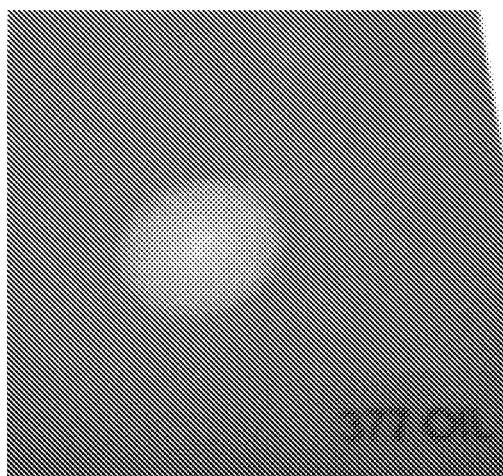

Olive oil test results for samples containing 10, 20 and 30% of calcium carbonate are shown in FIGS. 8a, 8b and 8c, respectively Various embodiments have been presented. It should be appreciated that in this document, words comprise, include, and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A fiber based substrate comprising at least one film layer on at least one surface of the fiber based substrate, wherein the film layer is produced from an aqueous dispersion comprising 0.1-20 wt-% at least one pigment material, 40-85 wt-% ethyl cellulose, and 10-50 wt-% at least one plasticizer based on total dry weight of the dispersion, wherein the total solids content of the dispersion is more than 30%, wherein D50 particle size of the ethyl cellulose is 10 nm-2 µm, and wherein the plasticizer comprises dibutyl sebacate, butyl stearate, castor oil, butyl stearate, polyethylene glycol and acetylated monoglycerides or mixtures thereof; wherein the fiber based substrate comprises an additional film layer on at least one surface of the substrate, wherein the additional film layer is a grease barrier selected from a water soluble cellulose derivative, an oxygen barrier, a mineral oil barrier or an aroma barrier; wherein the film layer comprises at least one additional agent comprising hydrophobic agent, wax, water retention and rheology modifier, defoamer, surfactants, lubricants, surface active agents or a mixture thereof; and wherein transition temperature (Tg) of the dispersion is −20° C.-50° C.

2. The fiber based substrate according to claim 1, wherein the fiber based substrate comprises fiber based packaging materials.

3. The fiber based substrate according to claim 1, wherein D50 particle size of the ethyl cellulose is 50 nm-1 µm.

4. The fiber based substrate according to claim 1, wherein the plasticizer has solubility to water less than 100 g/l.

5. The fiber based substrate according to claim 1, wherein a single layer of the film layer has weight of 0.5-30 g/m2.

6. An aqueous dispersion comprising 0.1-20 wt-% at least one pigment material, 40-85 wt-% ethyl cellulose, and 10-50 wt-% at least one plasticizer, based on total dry weight of the dispersion, and additionally at least one additional agent comprising hydrophobic agent, wax, water retention and rheology modifier, defoamer, surfactants, lubricants, surface active agents or a mixture thereof, wherein the total solids content of the dispersion is more than 30%, wherein D50 particle size of the ethyl cellulose is 10 nm-2 µm, wherein the plasticizer comprises dibutyl sebacate, butyl stearate, castor oil, butyl stearate, polyethylene glycol and acetylated monoglycerides or mixtures thereof; and wherein transition temperature (Tg) of the dispersion is −20° C.-50° C.

7. The aqueous dispersion according to claim 6, wherein D50 particle size of the ethyl cellulose is 50 nm-1 µm.

8. The aqueous dispersion according to claim 6, wherein the plasticizer has solubility to water less than 100 g/l.

9. A film produced from an aqueous dispersion comprising 0.1-20 wt-% at least one pigment material, 40-85 wt-% ethyl cellulose, and 10-50 wt-% at least one plasticizer based on total dry weight of the dispersion, and additionally at most 20 wt-% additional agent, based on total dry weight of the film, wherein the total solids content of the dispersion is more than 30%, wherein D50 particle size of the ethyl cellulose is 10 nm-2 µm, wherein the plasticizer comprises dibutyl sebacate, butyl stearate, castor oil, butyl stearate, polyethylene glycol and acetylated monoglycerides or mixtures thereof; wherein the film comprises at least one additional agent comprising hydrophobic agent, wax, water retention and rheology modifier, defoamer, surfactants, lubricants, surface active agents or a mixture thereof; and wherein transition temperature (Tg) of the dispersion is −20° C.-50° C.

* * * * *